April 30, 1963     W. R. GOSS ETAL     3,088,044

SUBSYNCHRONOUS TIMING MOTOR

Filed July 21, 1961

Inventors:
Wesley R. Goss,
Fred W. Suhr,
by H. F. Manbeck, Jr.
Attorney.

United States Patent Office 3,088,044
Patented Apr. 30, 1963

3,088,044
SUBSYNCHRONOUS TIMING MOTOR
Wesley R. Goss and Fred W. Suhr, both of Fort Wayne, Ind., assignors to General Electric Company, a corporation of New York
Filed July 21, 1961, Ser. No. 125,744
7 Claims. (Cl. 310—162)

Our invention relates to electric motors and more particularly to constant speed timing motors suitable for operating clocks, timers and other devices requiring a synchronous drive.

It is a primary object of our invention to provide a new and improved timing motor which will operate at a constant subsynchronous speed when energized from a source of normal power frequency. By a subsynchronous speed, we mean a speed which is an exact fraction of the synchronous speed for the motor involved, the synchronous speed, of course, depending upon the number of the stator poles and the source frequency; and by way of example, for a motor having two stator poles and energized from a 60 cycle source, the subsynchronous speeds would be the exact fractions of 3600 r.p.m., which is the synchronous speed for a two pole, 60 cycle motor.

Another object of our invention is to provide an improved subsynchronous timing motor which produces a relatively high output torque.

A further object of our invention is to provide an improved subsynchronous timing motor which is self-starting and synchronizing, and which is not affected by variations in supply line voltage within reasonable limits.

Still another object of our invention is to provide an improved subsynchronous timing motor which may be readily produced by mass production motor fabrication and assembly techniques.

In carrying out our invention in one form thereof, we provide a single phase motor having a stator and a rotor. The stator includes a plurality of pole sections and an energizing winding is mounted on the stator for exciting these pole sections. Mounted within the stator and excited from the pole sections is a rotor which is so constructed and arranged that it locks in and runs at a subsynchronous speed. According to our invention, this rotor includes a center hub or shaft on which are mounted a pair of axially spaced pole pieces. A permanent magnet is positioned between the pole pieces for exciting them, and each of the pole pieces includes a plurality of spaced, axially extending teeth at its periphery. The teeth on one pole piece extend into the spaces between the teeth of the other pole piece, and thereby a plurality of poles of alternate polarity are formed around the periphery of the rotor. These oppositely magnetized poles lock in with a space harmonic of the fundamental flux of the stator pole sections and thereby the rotor runs at a subsynchronous speed.

In order to accelerate the motor to the subsynchronous speed at which it locks in and runs, we provide a squirrel cage winding on the rotor, this winding being formed around the teeth at the periphery of the pole pieces. The winding includes end rings on the opposite sides of the rotor and in order to limit the torque produced by the squirrel cage winding and avoid acceleration of the rotor past the desired subsynchronous speed, we provide a plurality of gaps in the end rings. The gaps in each end ring are equal in number to the teeth on the respective pole pieces, and they are located in each end ring at the ends of the teeth protruding from the opposite pole piece. With this arrangement, the end rings discriminate against the rotor currents produced by the fundamental flux and all space harmonics except the one corresponding to the subsynchronous speed at which the motor is designed to run. Thus, the winding is effective to accelerate the rotor to the desired subsynchronous speed but does not produce enough torque to accelerate it beyond that speed once it locks in.

The subject matter which we regard as our invention is particularly pointed out and claimed in the concluding portion of this specification. Our invention, however, both as to its organization and method of operation, together with further objects and advantages thereof, may best be understood by reference to the following description taken in conjunction with the accompanying drawing in which:

Figure 1:
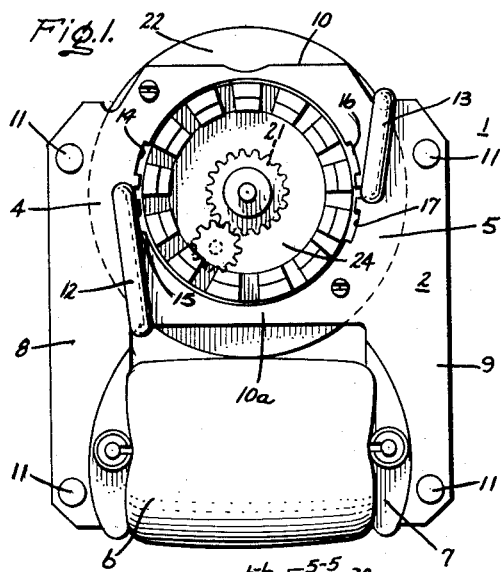
FIG. 1 is a front elevational view of a shaded pole motor embodying our invention in one form thereof.

Referring now to FIG. 1, we have shown therein a new and improved subsynchronous timing motor 1 which embodies our invention in one form thereof. The motor 1 includes a stator 2 and a rotor 3, with the rotor 3 being positioned between pole sections 4 and 5 of the stator. The pole sections 4 and 5 and thereby the rotor 3 are excited by means of a winding 6 which is disposed around a winding leg 7 forming part of the stator. The winding leg 7 is securely held between arms 8 and 9 of the stator and the magnetic flux resulting from the mmf. created by the winding passes between the winding leg and the pole sections 4 and 5 through the arms 8 and 9. The winding is arranged for energization from a single phase source of normal power frequency and thus an alternating flux varying sinusoidally with time is supplied to the pole sections. The mechanical structure of the stator is completed by means of narrow connecting sections 10 and 10a which extend between the pole sections 4 and 5. These connecting sections provide a rigid construction for the pole sections 4 and 5 but bypass only a very limited amount of flux around the rotor due to their very narrow width.

It will be understood that the stator 2 is preferably formed of a plurality of laminations of magnetic material, with FIG. 1 in effect showing the end lamination. The pieces forming the winding leg 7 are punched out of the main body of the laminations during their formation and are then assembled together for the winding and insulating of the coil. The winding leg and coil are then inserted as a unit between the arms 8 and 9 after the main body or yoke of the stator is assembled and riveted together by rivets 11.

To produce starting torque and suitable running characteristics for the motor, shading coils 12 and 13 are provided on the pole sections 4 and 5 of the stator. Each of these shading coils encompasses a portion of the associated pole section and thereby causes a flux shift in it relative to the unshaded portion of the pole section. It will be noted that the coils 12 and 13 pass through slots in the pole faces at their inner ends and, in the illustrated embodiment, these slots are positioned so that the shading coil span is 92 electrical degrees measured from the vertical center line of the stator to the shading coil slot. It will be understood, however, that the span may vary for best results in other embodiments of the invention.

To complete the description of the stator 2, it will be noted that small recesses or indentations are provided on both sides of the shading coil slots in the pole sections. Specifically, recesses 14 and 15 are positioned on opposite sides of the slot through which the shading coil 12 passes through the pole section 4, while the recesses 16 and 17 are similarly positioned with regard to the slot for the shading coil 13. The purpose of these recesses is to enhance the thirteenth space harmonic of the flux wave produced by the winding 6. The purpose of this intensifying of the thirteenth space harmonic will be discussed hereinafter in detail.

Figure 3:
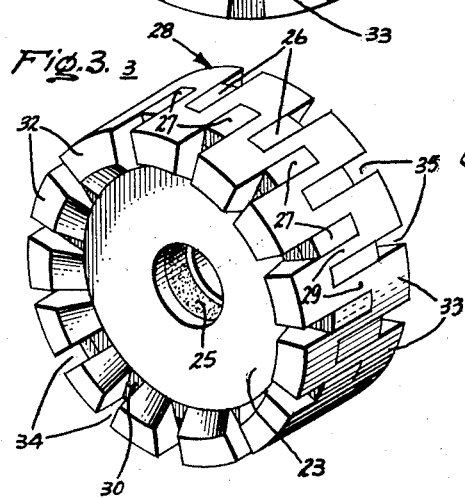
FIG. 3 is a perspective view of the rotor assembly with the hub and supporting shaft omitted.

As mentioned, the rotor 3 is positioned between the pole sections 4 and 5, and by our invention, it is so constructed and arranged that it runs at a constant subsynchronous speed upon energization of the winding 6. As shown in FIG. 3, the rotor 3 is constructed around a center mounting hub 18 which is formed of a suitable non-magnetic material, such as brass. In the illustrated embodiment, the hub 18 is rotatably mounted on a stationary shaft 20 and rotates on this shaft during the operation of the machine. An output gear 21 is carried on the left-hand end of the hub and this gear 21 serves as the input or drive gear to a timing gear train 22 positioned behind and mounted on the stator 2 (see FIG. 1). It will be understood, however, that our invention is not limited to an arrangement wherein the motor hub rotates on a center shaft. Rather, the hub could be formed as an integral part of an output shaft which is itself journaled on separate bearings.

Figure 2:
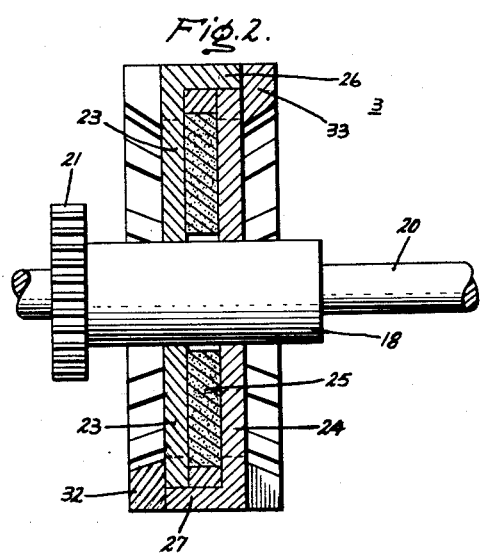
FIG. 2 is a cross sectional view of the rotor assembly included in the motor of FIG. 1.

Turning now to the details of the rotor 5, it will be seen from FIG. 2, that the rotor includes two pole pieces or plates 23 and 24 which are mounted in axially spaced relation on the non-magnetic hub 18. The pole pieces 23 and 24 may be formed of any suitable magnetic material and in our preferred embodiment, are formed of soft iron. The pole pieces are fixed in position on the hub being press fitted thereon, and the hub may be provided with a slight knurl to aid in securing them. Positioned between the pole pieces 23 and 24 on the hub 18 is a permanent magnet 25 which is axially polarized so that it excites the pole pieces 23 and 24 with opposite polarities. In the illustrated embodiment, the permanent magnet 25 is formed of ceramic material but any suitable permanent magnet may be used.

Figures 5, 6:
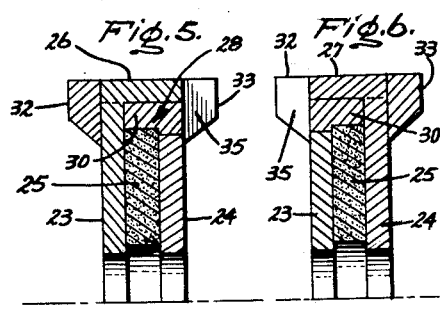
FIG. 5 is a fragmentary cross-sectional view of the rotor taken on the line 5—5 of FIG. 4.
FIG. 6 is a fragmentary cross-sectional view of the rotor taken on the line 6—6 of FIG. 4.

The pole pieces 23 and 24 each include a plurality of teeth at their outer periphery. The pole piece or plate 23 having the teeth 26 and the pole piece 24 having the teeth 27. As is best shown in FIGS. 2, 5 and 6, these teeth extend axially toward the opposite pole piece. In other words, the teeth 26 extend toward the pole piece 24 whereas the teeth 27 extend toward the pole piece 23. The teeth on each pole piece are evenly spaced apart by a distance greater than the tooth width itself, and the teeth on one pole piece extend into the spaces between the teeth of the other pole piece. This interfitting of the teeth may be best seen in FIG. 3, and it will be noted that the teeth 26 do not touch the teeth 27 but rather there is a circumferential spacing therebetween.

Since the pole pieces 23 and 24 are oppositely polarized by the permanent magnet 25, their teeth are also oppositely polarized. Thus, the teeth 26 and 27 form a plurality of poles of alternate polarity, spaced around the periphery of the rotor. In the illustrated embodiment, there are thirteen teeth on each pole piece and thus there are twenty-six poles formed around the periphery of the rotor with thirteen south poles disposed alternately with thirteen north poles. In accordance with our invention, these twenty-six poles lock in with the thirteenth space harmonic of the flux from the pole sections 4 and 5 during the operation of the motor, and thereby the motor runs at 1/13 of synchronous speed. In other words, the rotor 3 runs at a subsynchronous speed which is 1/13 of the speed of a two pole synchronous motor, or specifically 276 and 12/13 revolutions per minute.

To explain this operation a little more fully, it will be remembered that the pole sections 4 and 5 are excited by means of the flux set up by the mmf. created by the coil 6. This mmf. causes a fundamental flux, which is rectangular in space but varies sinusoidally in time, to pass between the pole sections 4 and 5 through the rotor 3. By Fourier analysis, it can be shown that any rectangular wave is made up of a number of harmonics and principally the odd harmonics. In the motor 1, the thirteenth harmonic is of significant value in the flux wave and as pointed out above, the recesses 14–17 are provided to enhance the formation of this harmonic. Thus, the rotor is subjected to a usable thirteenth space harmonic of the flux during operation.

The twenty-six poles on the rotor, provided by the teeth 26 and 27, lock in and run in synchronism with this thirteenth harmonic. In effect, the harmonic provides twenty-six stator poles in space and since there are twenty-six rotor poles, the motor runs as a twenty-six pole machine on the thirteen space harmonic. Since the space harmonic is varying sinusoidally in time at the same rate as the fundamental wave, the rotor runs as a twenty-six pole machine at the fundamental frequency (and not at a harmonic frequency in time), and thereby it runs at one-thirteenth of the speed of a normal two pole 60 cycle synchronous motor.

Although the motor 1 runs as a subsynchronous machine, once the rotor 3 is accelerated close to the subsynchronous speed, it does not have sufficient starting torque from the permanent magnet poles 26 and 27 to accelerate to the subsynchronous speed. Therefore, some additional means must be provided on the rotor to accelerate it from standstill to the subsynchronous speed where the rotor poles lock in with the thirteenth space harmonic flux from the stator. In order to produce this accelerating torque, we provide a squirrel cage accelerating winding on the rotor which, due to the currents induced in it by the stator flux, produces sufficient torque to accelerate the rotor to the subsynchronous lock-in or running speed. This squirrel cage winding, which is generally indicated at 28, is formed of an electrically conductive, non-magnetic material and specifically in the illustrated embodiment is formed of cast aluminum.

Figure 4:
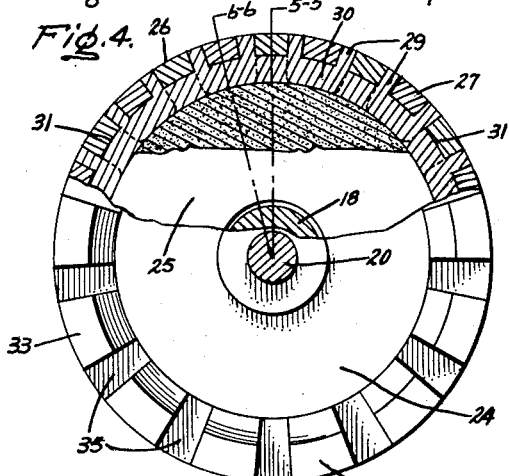
FIG. 4 is an end view of the rotor assembly, partially broken away to show details.
Figure 7:
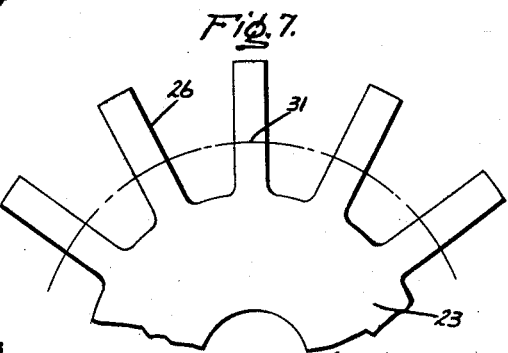
FIG. 7 is a fragmentary view illustrating one of the rotor pole pieces before it is assembled into the rotor.

The winding 28 includes conductors or bars 29 fitting between the adjacent teeth 26 and 27 of the rotor pole pieces and it also includes sections 30 which are formed around the magnet 25 beneath the teeth 26 and 27. As is best shown in FIG. 4, the teeth 26 and 27 are not bent axially at the root or base where they join the plates 23 and 24. Rather the teeth are bent axially at a point somewhat above their junctures with the main body of the pole pieces. This may be also seen in FIG. 7 where we have illustrated one of the pole pieces after it is initially stamped out but prior to the operation in which the teeth are bent axially. In FIG. 7, the arcuate line 31 illustrates the point at which the teeth 26 are bent axially to form the rotor poles. This line 31 may also be seen in FIG. 4. Besides the bars 29 between the teeth and the sections 30 between the teeth and the permanent magnet, the squirrel cage winding 28 also includes end rings on either side of the motor, these end rings being generally indicated at 32 and 33. With the winding 28 cast around the permanently magnetized teeth 26 and 27, sufficient starting torque is provided to accelerate the motor to the subsynchronous speed at which it is desired to run.

It is essential, however, that the rotor 3 should not pass through the desired subsynchronous operating speed, once it reaches that speed. In other words, the squirrel cage winding 28 must provide enough torque to accelerate the motor to the subsynchronous speed but must not produce sufficient torque under the applied load conditions to accelerate the motor through the point where the pole teeth 26 and 27 lock in with the thirteenth space harmonic flux from the stator. In order to provide such a limiting action on the torque produced by the squirrel cage winding, we provide a plurality of gaps in the end rings 32 and 33 of the winding. Specifically, we provide as many gaps in each end ring as there are teeth on the respective pole pieces 23 and 24. Thus, the end ring 32 is provided with thirteen gaps and the end ring 33 is provided with a like number of gaps. Referring in particular to FIG. 3, the gaps in the end ring 32 are indicated by the numeral 34, while the gaps in the end ring 33 are indicated by the numeral 35.

The purpose of these gaps is to discriminate against rotor currents produced by the fundamental space component of the stator flux and all the space harmonics except the thirteenth harmonic. Thus, not only is the number of gaps important but so also is the location of the gaps. In the illustrated embodiment, it will be seen that the gaps are located directly opposite the teeth or poles 26 and 27. Specifically, the gaps in each end ring are located at the end of the teeth protruding from the opposite pole piece. Thus, the gaps 34 are located opposite the ends of the teeth 27 projecting from the pole piece 24, while the gaps 35 are located opposite the ends of the teeth 26 projecting from the pole piece 23. The gaps are just as wide as the teeth and they extend inwardly for the full depth of the end ring to the end of the teeth. It has been found that this arrangement provides the best discrimination against the rotor currents produced by the fundamental space component of the flux and the other space harmonics while at the same time not interfering with the rotor currents produced by the thirteenth space harmonic. Thus, the squirrel cage winding plays a large measure in accelerating the rotor to the subsynchronous speed where the twenty-six stator poles lock in with the thirteenth space harmonic flux from the stator, but does not provide sufficient torque to accelerate the rotor beyond the speed.

From the above, it will be seen that we have provided a new and improved motor which is constructed and arranged to rotate at a constant subsynchronous speed. The illustrated motor is, of course, arranged to run on the thirteenth space harmonic of the stator flux thereby operating at one-thirteenth of the normal synchronous speed for two pole motors. However, it will be understood that our invention could be used with motors designed to run on other space harmonics of the fundamental flux, and particularly on the odd harmonics. In particular, by changing the number of teeth on the pole pieces 23 and 24 to correspond with the selected harmonic and by similarly varying the gaps in the end rings 32 and 33, the motor could be designed to run on other space harmonics. The recesses 14-17 in the stator are, of course, arranged in the illustrated embodiment to enhance the formation of the thirteenth space harmonic flux but if an embodiment is to be designed to run on another space harmonic, the stator recesses might be changed to encourage the formation of the selected harmonic rather than the thirteenth. It will also be understood that depending upon the particular motor involved, it may be desirable to have more than two recesses in the respective pole sections, the number and arrangement of the recesses being selected to strengthen the thirteenth or other selected harmonic to the best extent. The span of the shading coils 12 and 13 may also be varied so as to enhance the selected harmonic.

It will also be seen that the motor 1 may be readily produced by mass production motor assembly techniques, which is, of course, very desirable for a motor to be used with timing devices and the like. The stator 2 is similar in many respects to the stator of a normal speed, shaded pole motor and may be formed and assembled in a like manner. As mentioned above, the illustrated stator is formed of a number of laminations held together by the rivets 11. The shading coil slots and the recesses 14-17 are formed during the punching operations for the laminations, and the pieces for the winding leg 7 are also struck out at that time. The pieces for the winding leg are assembled separately, the coil 6 is wound thereon and insulated, and then the leg and coil are inserted between the arms 8 and 9 of the main stator yoke. This completes the stator assembly except for the shading coils which may be inserted either before or after the winding leg and coil.

The rotor 3 is formed of only three parts in addition to the hub and the squirrel cage winding. The pole pieces 23 and 26 being relatively thin, may be punched out of sheet material (preferably soft iron) in planar form as indicated in FIG. 7. The teeth are then bent axially along the line 31 in a suitable forming operation, and the pole pieces and magnet 23 are placed on the hub with the teeth in the indicated interfitting spaced relationship. The pole pieces are illustrated as press fitted onto the hub, but it will be understood that other securing means could be used. With the pole pieces and magnet in place, a simple casting operation then forms the squirrel cage winding 28, with the gaps 34 and 35 being formed either during the casting operation or being cut out thereafter. This completes the rotor assembly, with the rotor then being placed in position within the stator to form the complete motor.

While in accordance with the patent statutes we have described what at present is considered to be the preferred embodiment of our invention, it will be obvious to those skilled in the art that various changes and modifications may be made therein without departing from the invention and it is therefore aimed to cover all such modifications in the apppended claims.

What we claim as new and desire to secure by Letters Patent of the United States is:

1. In an electric motor, a rotor comprising a pair of concentrically mounted axially spaced pole pieces, a permanent magnet between said pole pieces for exciting said pole pieces, each of said pole pieces having a plurality of spaced axially extending teeth, with the teeth on one pole piece extending into the spaces between the teeth of the other pole piece thereby to form a plurality of spaced poles of alternate polarity, and a starting winding formed around said teeth and including an end ring on each side of the rotor, each of said end rings including a plurality of gaps located respectively at the ends of the teeth protruding from the opposite pole piece.

2. In an electric motor intended for operation at a subsynchronous speed from the source of normal power frequency, a hub, a pair of axially spaced pole pieces mounted on said hub, a permanent magnet mounted on said hub between said pole pieces for exciting said pole pieces, each of said pole pieces having an odd number of circumferentially arranged evenly spaced axially extending teeth, with the teeth on one pole piece extending into the spaces between the teeth of the other pole piece thereby to provide a plurality of spaced poles of alternate polarity, the number of said teeth on each pole piece corresponding to the number of the selected space harmonic of the stator flux with which said rotor is to be synchronized during operation, and a squirrel cage starting winding formed around said teeth and including an end ring on each side of said rotor, each of said end rings including an odd number of gaps corresponding to the number of teeth on each of said pole pieces, with said gaps being located respectively at the ends of the teeth protruding from the opposite pole piece thereby to limit the torque produced by said squirrel cage winding and avoid the acceleration of said rotor past said subsynchronous speed.

3. In an electric motor intended for operation at a subsynchronous speed from a source of normal power frequency, a non-magnetic hub, a pair of axially spaced pole pieces mounted on said hub, an axially polarized permanent magnet mounted on said hub between said pole pieces for exciting said pole pieces, each of said pole pieces having thirteen evenly spaced axially extending peripheral teeth, with the teeth on one piece extending into the spaces between the teeth of the other pole piece thereby to form twenty-six poles of alternate polarity, and a cast squirrel cage winding formed around said teeth and including an end ring on each side of the rotor, each of said end rings including thirteen gaps, with said gaps being located respectively at the ends of the teeth protruding from the opposite pole piece.

4. A single phase motor intended for operation at a subsynchronous speed from a source of normal power frequency, comprising a stator including a plurality of pole sections, winding means mounted on said stator for exciting said pole sections, a shading coil associated with each of said pole sections, with each of said shading coils extending through a slot in the associated pole section, recess means formed in the face of each of said pole sections adjacent to said shading coil slot thereby to enhance the formation of a selected space harmonic of the fundamental stator flux, and a rotor comprising a pair of concentrically mounted axially spaced pole pieces, a permanent magnet mounted between said pole pieces for exciting said pole pieces, each of said pole pieces having a plurality of spaced axially extending peripheral teeth, with the teeth of one pole piece extending into the spaces between the teeth of the other pole piece thereby to form a plurality of spaced poles of alternate polarity, and a squirrel cage winding formed around said teeth and including an end ring on each side of said rotor, each of said end rings including a plurality of gaps located respectively at the ends of the teeth protruding from the opposite pole piece.

5. A single phase motor intended for operation at a subsynchronous speed from a source of normal power frequency, comprising a stator including a plurality of pole sections, winding means mounted on said stator for exciting said pole sections, a shading coil associated with each of said pole sections, with each of said shading coils extending through a slot in the associated pole section, a plurality of recesses formed in the face of each of said pole sections on opposite sides of said shading coil slot thereby to enhance the formation of a selected harmonic of the fundamental stator flux, and a rotor comprising hub means, a pair of axially spaced pole pieces mounted on said hub means, a permanent magnet mounted on said hub between said pole pieces for exciting said pole pieces, each of said pole pieces having an odd number of spaced axially extending teeth with the teeth of one pole piece extending into the spaces between the teeth of the other pole piece thereby to form a plurality of spaced poles of alternate polarity, the number of said teeth on each pole piece corresponding to the number of the selected space harmonic of the stator flux with which said motor is to synchronize during operation, and a squirrel cage starting winding cast around said teeth and including an end ring on each side of said rotor, each of said end rings including an odd number of gaps corresponding to the number of teeth on each of said pole pieces, with said gaps being located respectively at the ends of the teeth protruding from the opposite pole piece.

6. In an electric motor intended for operation at a subsynchronous speed from the source of normal power frequency, a non-magnetic hub, a pair of axially spaced pole pieces mounted on said hub, a permanent magnet mounted on said hub between said pole pieces for exciting said pole pieces, each of said pole pieces having a plurality of integrally formed spaced teeth at the periphery thereof, said teeth on each pole piece being bent to extend axially toward the other pole piece, and the teeth on one pole piece extending into the spaces between the teeth of the other pole piece thereby to provide a plurality of spaced poles of alternate polarity, the number of said teeth on each pole piece corresponding to the number of the selected space harmonic of the stator flux with which said rotor is to be synchronized during operation, and a squirrel cage starting winding of non-magnetic electrically conductive material formed around said teeth, said winding including bars between said teeth, sections under said teeth and an end ring on each side of said rotor, and each of said end rings including a plurality of gaps located respectively at the ends of the teeth protruding from the opposite pole piece, thereby to limit the torque produced by said squirrel cage winding and avoid the acceleration of said rotor past said subsynchronous speed.

7. A subsynchronous electric motor comprising a stator having a plurality of pole sections, alternating current winding means arranged on said stator for exciting said pole sections, and a rotor arranged for operation at a subsynchronous speed, said rotor including a permanent magnet, means excited by said permanent magnet and defining a plurality of spaced poles of alternate polarity at the periphery of said rotor, said poles of said rotor being greater in number than said pole sections of said stator, and an accelerating winding formed around said poles and including an end ring on each side of said rotor, with each of said end rings including gaps to limit the torque produced by said winding and avoid the acceleration of said rotor past said subsynchronous speed.

No references cited.